United States Patent Office 3,444,686
Patented May 20, 1969

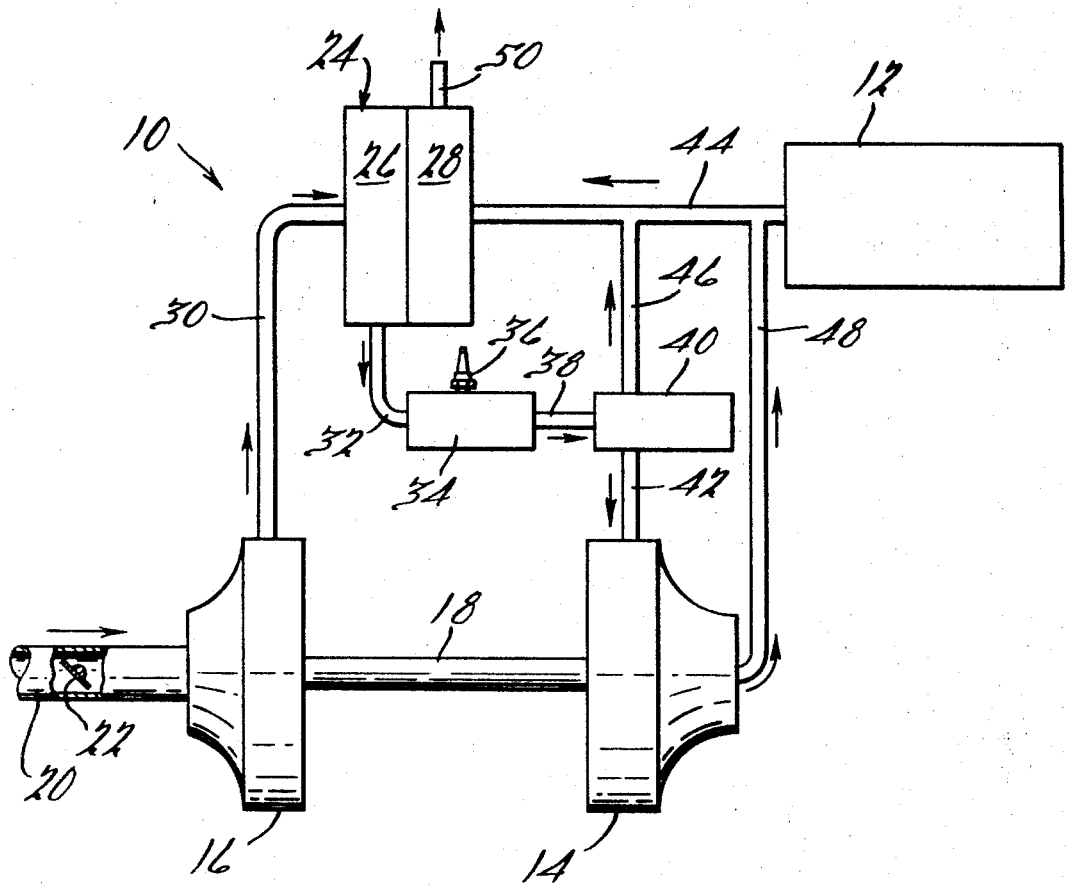

3,444,686
GAS TURBINE SMOG CONTROL FOR
INTERNAL COMBUSTION ENGINE
James Knowles, Bloomfield Hills, Mich., assignor to Ford
Motor Company, Dearborn, Mich., a corporation of
Delaware
Filed Nov. 22, 1967, Ser. No. 685,203
Int. Cl. F02b 41/10; F02c 7/10
U.S. Cl. 60—11                                    8 Claims

ABSTRACT OF THE DISCLOSURE

A power plant including the combination of a reciprocating engine with a gas turbine engine and designed particularly to decrease engine emissions contributing to smog. A portion of the turbine nozzle gas is combined with the exhaust gases of the reciprocating engine to serve as the hot fluid for a turbine regenerator. Also, a turbine compressor throttle valve is utilized to maintain constant turbine speed during periods of light turbine loads.

Background of the invention

It is well known that the exhaust gases of internal combustion reciprocating engines are a contributing factor to the atmospheric pollution condition known as "smog" due to the presence of carbon monoxide and unburned hydrocarbons in these exhaust gases. Also, it is known in the art to form a power plant utilizing a reciprocating engine as a main source of power with a turbine engine as an alternate or auxiliary source of power. Such power plants often combine the exhaust gases from a reciprocating engine with the gases entering a turbine from a turbine compressor and subsequently utilize the turbine exhaust as the high temperature fluid for a turbine regenerator. Such an arrangement and the advantages thereof are disclosed by Unites States Patent 2,848,866, issued Aug. 26, 1958.

It is an object of this invention to provide a power plant including a reciprocating engine and a gas turbine engine whereby a more complete combustion of the reciprocating engine exhaust gases will be accomplished in order to minimize pollution of the atmosphere thereby. This advantage is accomplished by treatment of the reciprocating engine exhaust gases in the turbine system with an accompanying increase in turbine efficiency without passing the reciprocating engine exhaust gases through the turbine itself.

Description of the drawing

The figure of the drawing is a schematic representation and flow diagram of the power plant of this invention.

Detailed description of the invention

Referring now in detail to the invention, the numeral 10 denotes generally a power plant constructed in accordance with this invention and utilizing as sources of power a reciprocating internal combustion engine 12 and gas expansion turbine 14. Treatment of the exhaust gases of reciprocating engine 12 is accomplished within the fluid circuit of turbine 14 to minimize the carbon monoxide and unburned hydrocarbons exhausted into the atmosphere. This treatment, to be described in detail below, also provides for increased operating efficiency of the turbine.

Turbine 14 is connected to and drives a compressor 16 by means of a power transmitting shaft 18 in the conventional manner. Compressor 16 receives air through an intake manifold 20 having a throttle valve 22 positioned therein.

Included as part of the turbine system is a conventional regenerator or heat exchanger 24 having a cold fluid passage 26 and a hot fluid passage 28. Compressed air from compressor 16 is conveyed by a fluid conduit 30 to cold fluid passage 26 wherein the air is heated by hot regenerator fluid passing through hot fluid passage 28. The composition of the hot fluid of the regenerator will be detailed below.

Heated air exits cold fluid passage 26 via fluid conduit 32 and is conveyed thereby to a burning chamber 34. Fuel is mixed with the heated air within chamber 34 and the mixture ignited by a glow plug 36 in the conventional manner. The hot, high pressure gases exiting burning chamber 34 are conveyed by a fluid conduit 38 to a turbine nozzle 40 and, after passing through this nozzle, are admitted to turbine 14 via a fluid conduit 42.

As may be observed from the drawing, reciprocating engine 12 and hot fluid passage 28 of regenerator 24 are interconnected by a fluid conduit 4. Exhaust gases from reciprocating engine 12 are carried by this conduit 44 to hot fluid passage 28. Prior to the introduction of these exhaust gases into the regenerator, they are combined with a portion of the turbine nozzle fluid bled from nozzle 40 and conveyed to conduit 44 by a fluid conduit 46. It has been found that this high temperature nozzle fluid is rich in oxgen so that its combination with the exhaust gases from reciprocating engine produces a transformation of the exhaust gas carbon monoxide into carbon dioxide and provides for a more complete combustion of the unburned hydrocarbons present within conduit 44.

As is conventional, exhaust gases from turbine 14 also are directed to the hot passage of the turbine regenerator. In the power plant of this invention, however, the turbine exhaust gases are conveyed by a fluid conduit 48 to conduit 44 for combination with reciprocating engine exhaust gases and exposure to turbine nozzle fluid prior to the entry of the turbine gases into regenerator 24. The nozzle fluid introduced to conduit 44 by conduit 46 acts on turbine exhaust gas in a manner similar to its treatment of reciprocating engine exhaust gases to reduce the presence of air pollutants. Turbine exhaust gases thus are combined with reciprocating engine exhaust gases prior to the introduction of nozzle fluid. It may be seen, therefore, that the junction of conduits 44 and 48 is located upstream from the junction of conduits 44 and 46. The hot regenerator fluid is exhausted to the atmosphere by an exhaust pipe 50.

Since the hot regenerator fluid of this invention is a combination of reciprocating engine gases, turbine exhaust gases and nozzle fluid that produces combustion in the exhaust gases, the hot regenerator fluid is at a significantly higher temperature than conventional regenerator fluid composed of turbine exhaust gases alone. This increase in temperature leads to a corresponding increase in the temperature of air leaving cold fluid passage 26 by conduit 32 and an attendant increase in turbine operating efficiency.

It has been found necessary to utilize throttle valve 22 to restrict air flow through air intake manifold 20 to maintain constant turbine speed during periods of light turbine loads. By so regulating turbine speeds, the well known and undesirable turbine condition known as "surging" is prevented.

Thus, it may be seen that this invention provides a power plant wherein both an internal combustion reciprocating engine and a gas turbine engine are utilized as power sources and wherein control of air polluting emissions is controlled by treatment of exhaust gases in the turbine system. This advantage is accompanied by an increase in turbine operating efficiency without varying the composition of the fluid introduced into the turbine itself.

I claim:
1. In a power plant including a reciprocating engine, a driving gas turbine mechanically connected to a driven compressor, a heat exchange having a hot fluid passage and a cold fluid passage, a fuel burning chamber, a turbine nozzle, first fluid conduit means providing a fluid path from said compressor through said cold fluid passage, burning chamber and turbine nozzle to said turbine, the improvement comprising: second fluid conduit means conveying reciprocating engine exhaust gases to said hot fluid passage, and third fluid conduit means conveying a portion of turbine nozzle gas said second fluid conduit for mixture with reciprocating engine exhaust gases prior to introduction of the latter into said hot fluid passage.

2. The power plant of claim 1, wherein said improvement further comprises: fourth fluid conduit means conveying turbine exhaust gases to said second fluid passage for mixture with said reciprocating engine exhaust gases.

3. The power plant of claim 2, wherein the junction between said second and fourth fluid conduit means is located upstream of the junction between said second and third fluid conduit means.

4. In a power plant including a reciprocating engine, a driving gas turbine, a driven air compressor mechanically connected to said turbine and having air intake means and air outlet means, a regenerative heat exchanger having a hot fluid passage and a cold fluid passage, first conduit means inter-connecting said compressor outlet and said cold fluid passage, second conduit means including a fuel burning chamber inter-connecting said cold fluid passage and said turbine, third conduit means interconnecting said turbine and said hot fluid passage and conveying turbine exhaust gases from the former to the latter, the improvement comprising: fourth fluid conduit means by-passing said turbine and operatively interconnecting said reciprocating engine and said hot fluid passage and conveying reciprocating engine exhaust gases to said hot fluid passage.

5. In the power plant of claim 4, wherein said third and fourth fluid conduit means are interconnected whereby said turbine exhaust gases and reciprocating engine exhaust gases are mixed prior to introduction of said exhaust gases to said hot fluid passage.

6. In the power plant of claim 4, wherein said second fluid conduit means includes a turbine nozzle located downstream of said burning chamber, and fifth fluid conduit means connecting said turbine nozzle and said fourth fluid conduit means conveying a portion of nozzle gas for mixture with said reciprocating engine exhaust gas prior to the introduction of the latter into said hot fluid passage.

7. In the power plant of claim 6, wherein said third and fourth fluid conduit means are interconnected whereby said turbine exhaust gases and reciprocating engine exhaust gases are mixed prior to introduction of said exhaust gases to said hot fluid passage.

8. In the power plant of claim 6, a throttle valve positioned in said compressor air intake means and maintaining a constant turbine speed during periods of light turbine loads.

References Cited
UNITED STATES PATENTS

| | | | |
|---|---|---|---|
| 2,159,758 | 5/1939 | Diedrich | 60—11 |
| 2,633,698 | 4/1953 | Nettel | 60—13 |
| 2,848,866 | 8/1958 | Geislinger | 60—12 |
| 3,306,035 | 2/1967 | Morrell | 60—30 |

CARLTON R. CROYLE, *Primary Examiner.*

DOUGLAS HART, *Assistant Examiner.*

U.S. Cl. X.R.

60—39.51; 30